UNITED STATES PATENT OFFICE.

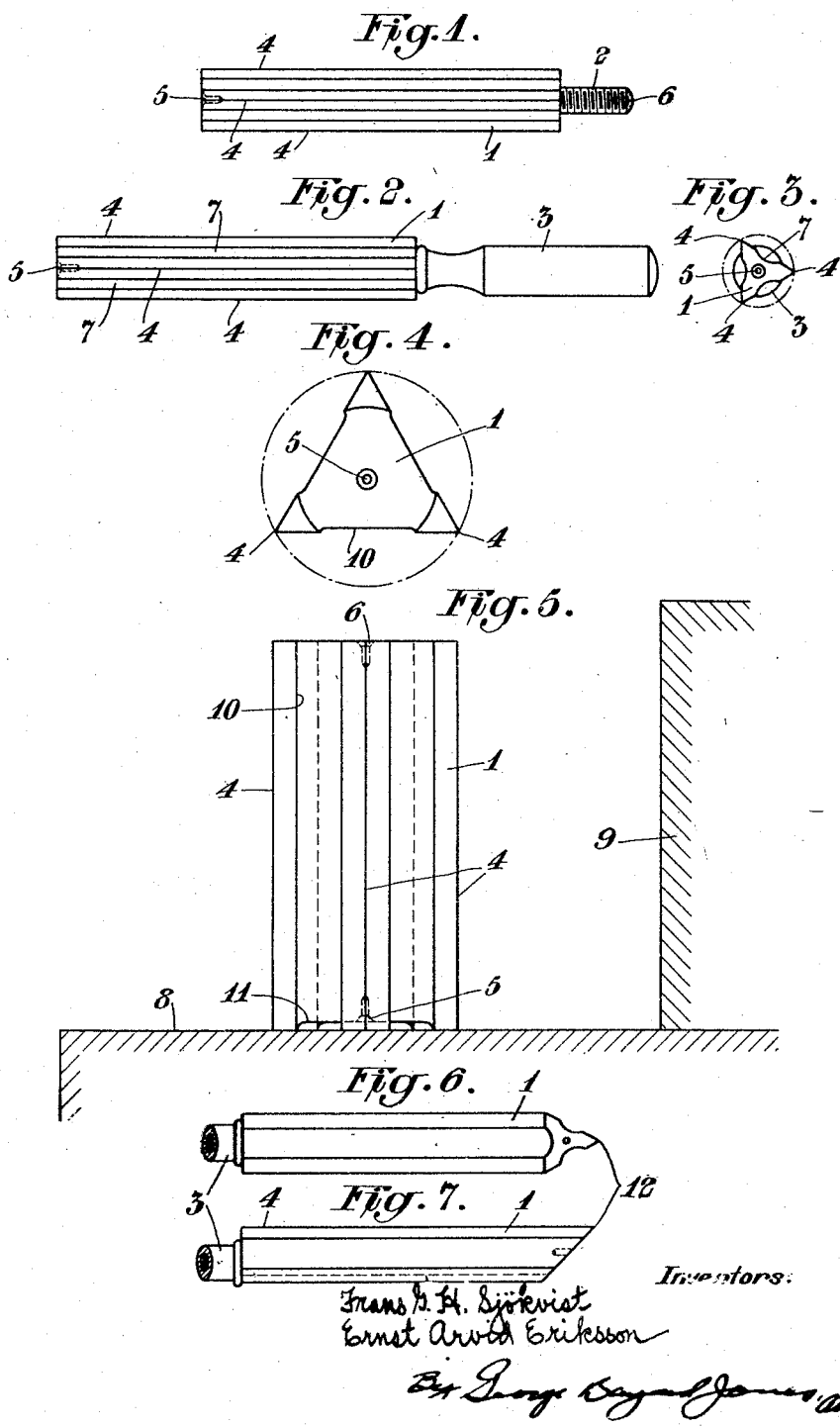

FRANS GUSTAF HELMER SJÖKVIST AND ERNST ARVID ERIKSSON, OF ESKILSTUNA, SWEDEN, ASSIGNORS TO AKTIEBOLAGET C. E. JOHANSSON, OF ESKILSTUNA, SWEDEN.

INSTRUMENT FOR INSPECTING AND TESTING SURFACES AND ANGLES.

1,365,286.     Specification of Letters Patent.     Patented Jan. 11, 1921.

Application filed May 31, 1918. Serial No. 237,664.

*To all whom it may concern:*

Be it known that we, FRANS GUSTAF HELMER SJÖKVIST and ERNST ARVID ERIKSSON, subjects of the King of Sweden, and residents of Eskilstuna, in the Kingdom of Sweden, have invented a new and useful Improvement in Instruments for Inspecting and Testing Surfaces and Angles, of which the following is a specification.

This invention relates to an instrument for inspecting and testing plane, cylindrical, conical and other surfaces which contain one or more straight lines, as well as angles, and the invention has for its purpose to provide such an instrument which is simple and inexpensive, but at the same time reliable and unchangeable in the highest possible degree, and which may be readjusted in a simple manner when worn and deformed after use during a long time.

The instrument consists broadly of an elongated prismatic or nearly prismatic body all the edges of which extending in the longitudinal direction of the body lie on the surface of a circular cylinder or cone, and which body is provided at its ends with center holes or the like which holes lie on the axis of the said cylinder or cone. In this manner the advantage is obtained that the body may be set in a lathe or a grinding machine and may be ground over its edges, which in this manner may easily be adjusted so as to become perfectly straight. The body should preferably have the shape of a triangular prism, so that its longitudinal edges which are to be used when inspecting or testing the said surfaces, may become sharp. The tests or inspections are hereby facilitated, the light shining through clearly when such a sharp straight edge is placed against an object if the object deviates from the straight line in any slight degree at the place of contact. Such sharp edges may of course also, if desired, be obtained by grinding the side surfaces of the body somewhat concave between the edges.

In the accompanying drawing a few embodiments of the invention are shown by way of example. Figure 1 shows a side view of one embodiment of the instrument. Fig. 2 shows a side view of the instrument with a handle attached, and Fig. 3 shows an end view of the instrument. Fig. 4 shows an end view and Fig. 5 a side view of another embodiment which may also be used for probing or testing right angles. Figs. 6 and 7 show two side views of a somewhat modified embodiment of the instrument according to Figs. 1 to 3.

The instrument illustrated in Figs. 1 to 3 consists of a body 1 of hardened steel in the shape of an equilateral triangular prism, said body being provided at one end with a threaded stud 2 by means of which it may be attached to a handle 3 of a heat-insulating material, for instance hard rubber. The three parallel edges 4 of the body 1 which are to be used for inspections or tests, lie, as will be understood from Fig. 3, on the surface of a circular cylinder, indicated by a dotted and dashed circle in Fig. 3, that is to say the edges are located at equal distances from the longitudinal axis of the body, which axis is defined by the center holes 5 and 6. By means of these holes it is thus possible easily to set the body 1 in a grinding machine and to grind its edges 4 so that they become perfectly straight. The insulating handle 3 by means of which the instrument is held when used, serves to prevent the body 1 from bending owing to the influence of the heat of the hand. Such bending would easily occur if the body 1 is held directly by the hand, as the edge or the edges held between the fingers would expand more rapidly and thus become longer than the edge held against the object to be inspected. The body is also more securely prevented from bending when the handle is attached to one end of the same.

The sides of the body 1 between the parallel edges 4 are provided with grooves 7, as shown in Fig. 3, said grooves serving to decrease the weight of the body and also to reduce the operation of grinding the otherwise plane surfaces. On account of these grooves the edges 4 also retain better their straightness and are not so easily bent owing to tensions in the material as is apt to occur with rulers or straight edges provided with only one edge and with thicker material on the opposite side of the edge.

When using the instrument described, for instance for testing or inspecting a plane surface, one of the edges 4 of the prismatic body is held against the surface. If the surface is not perfectly plane the light will shine through, so that it will be instantly detected if and where there is a defect or a flaw. If a cylindrical or a conical surface is to be inspected the instrument is of course held in such manner that one of its edges 4 will rest along a generatrix of the surface.

Figs. 4 and 5 show a modified embodiment of the instrument which may also be used for testing straight angles. The length of the prismatic body 1 is in this instance essentially shorter as compared to the diameter of the cylinder circumscribed. The body is also not provided with a handle nor with a stud for securing a handle. The center holes 5 and 6 are located in both end surfaces which are ground perpendicularly to the longitudinal axis of the body and to the parallel edges 4. In this manner perfect right angles are obtained at the corners between the said edges and the end surfaces, which angles may easily be readjusted in a grinding machine when the edges 4 have become worn or deformed.

When using the instrument for testing angles the body 1 is placed on one end on a surface plate 8 on which the object or work 9 to be tested is also placed and is moved against one of the edges 4 when it will immediately be detected whether there is any deviation. The right angles of the body 1 may easily be checked by moving in similar manner the three edges 4 one after another against an angle or the like previously adjusted. Also in this embodiment there may be provided recessses 10 in the side surfaces and recesses 11 in the end surfaces, in order to facilitate the manufacture. Particularly if both end surfaces of the body 1 are adjusted at right angles to the edges 4, an exceedingly accurate checking of the angles may be made by also turning the body upside down.

The embodiment illustrated in Figs. 6 and 7 is distinguished from the embodiment according to Figs. 1 to 3 only by this that the body 1 is cut off obliquely at one end, namely the end opposite that at which the handle 3 is attached, in such manner that one of the edges 4 forms a point 12 at this end. In this manner it is attained that the said edge of the body may be used for inspecting surfaces located below a projecting part which would prevent the use of the body according to Figs. 2 or 5.

We claim:

1. An instrument for inspecting and testing surfaces and angles, consisting of an elongated substantially prismatic body all edges of which extending in the longitudinal direction of the body lie on a surface generated by revolution of a straight generatrix around an axis lying in the same plane with the generatrix, and which body is provided at its ends with center holes on said axis.

2. An instrument for inspecting and testing surfaces and angles, consisting of an elongated substantially prismatic body all edges of which extending in the longitudinal direction of the body lie on a surface generated by revolution of a straight generatrix around an axis lying in the same plane with the generatrix, said body having a screw-threaded stud at one end concentric with said axis and being provided at its other end and at the end of said stud with center holes on said axis.

FRANS GUSTAF HELMER SJÖKVIST.
ERNST ARVID ERIKSSON.